(12) United States Patent
Pohjolainen et al.

(10) Patent No.: US 8,111,694 B2
(45) Date of Patent: Feb. 7, 2012

(54) IMPLICIT SIGNALING FOR SPLIT-TOI FOR SERVICE GUIDE

(75) Inventors: Topi Pohjolainen, Helsinki (FI); Martin Jansky, Espoo (FI); Jani Poikela, Helsinki (FI); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 1604 days.

(21) Appl. No.: 11/247,474

(22) Filed: Oct. 11, 2005

(65) Prior Publication Data

US 2006/0218586 A1 Sep. 28, 2006

Related U.S. Application Data

(60) Provisional application No. 60/664,332, filed on Mar. 23, 2005.

(51) Int. Cl.
*H04L 12/56* (2006.01)
*G06F 3/00* (2006.01)

(52) U.S. Cl. .......................................... 370/392; 725/39
(58) Field of Classification Search ........................ None
See application file for complete search history.

(56) References Cited

U.S. PATENT DOCUMENTS

| | | | |
|---|---|---|---|
| 7,295,763 B1 * | 11/2007 | Cooper et al. | 386/324 |
| 2005/0090235 A1 * | 4/2005 | Vermola et al. | 455/414.3 |
| 2005/0160184 A1 * | 7/2005 | Walsh et al. | 709/247 |
| 2006/0053450 A1 * | 3/2006 | Saarikivi et al. | 725/46 |
| 2006/0092867 A1 * | 5/2006 | Muller et al. | 370/312 |

FOREIGN PATENT DOCUMENTS

| | | |
|---|---|---|
| EP | 0551433 | 7/1993 |
| EP | 1276324 A1 | 1/2003 |
| EP | 1316220 | 12/2004 |
| WO | WO0221848 | 3/2002 |
| WO | WO0250708 | 6/2002 |
| WO | WO 02/061616 | 8/2002 |
| WO | WO 02/063775 A2 | 8/2002 |
| WO | WO 02/063776 A2 | 8/2002 |
| WO | WO03007614 | 1/2003 |
| WO | WO 03/032148 | 4/2003 |
| WO | WO 03/034735 | 4/2003 |
| WO | WO 2004/015917 | 2/2004 |

OTHER PUBLICATIONS

U.S. Appl. No. 10/917,700, filed Aug. 13, 2004, Grant.

(Continued)

*Primary Examiner* — Melanie Jagannathan
(74) *Attorney, Agent, or Firm* — Ditthavong Mori & Steiner, P.C.

(57) ABSTRACT

The invention provides an efficient transportation of ESG fragments to a mobile device through the formation of containers. In this sense, a container comprises at least one ESG fragment, but may contain a plurality of fragments. A fragment may be also carried in more than one container. Aspects of the present invention utilize a simple and extensible header structure apart from the fragments independent of the type and format of the individual fragments. In further embodiments, compression is applied over the entire container, including the fragments and any headers. In yet further embodiments, a 3GPP metadata envelope is carried within the container without the need for unnecessary repetition of parameters, such as for example, version, validity time, and identification. In further embodiments, a simplified container system allowing for the updating of previously received fragments is disclosed.

20 Claims, 12 Drawing Sheets

OTHER PUBLICATIONS

Thierry Levesque, Sebastien Campion, "ESG Transport Mechanims", Sep. 16, 2004, pp. 1-18.
"Metadata for TV-Anytime Phase 2 Technologies", Specification Series: S-3 (Phase 2), Aug. 13, 2004, pp. 1-71.
"TV-Anytime Response to DVB CBMS IPDC Call for Technology", Sep. 16, 2004, pp. 1-25.
"DVB—Call for Technologies response to Electronic Service Guide", TeliaSonera, pp. 1-6.
3GPP Organization Partners, "Protocols and Codecs (Release 6)", Sep. 2004, pp. 1-42, (redlined version).
3GPP Organization Partners, "Protocols and Codecs (Release 6)", Sep. 2004, pp. 1-38.
"MBMS Protocols and Codecs TS 26.346 V1.0.2", TSG-Sa WG4 PSM SWG#6 meeting, Oct. 13, 2004, p. 1.
Keith Millar NDS, "Metadata delivery for IPDC in DCB-H (Response to CBMS Call for Technology)", Sep. 15, 2004, p. 1-42.
"Input to Call for Technology for IP Datacast in DVB-H" ESG Transport: Proposals for an Efficient Mapping of Service Description on a DVB-H Bearer, Motorola Labs, pp. 1-11.
Siemens—Vodafone, "Electronic Service Guide: ESG Representation Layer", Sep. 16, 2004, pp. 1-8.
Nokia—Siemens—Vodafone, "Electronic Service Guide: Framework", Sep. 16, 2004, pp. 1-8.
Siemens—Vodafone, "Electronic Service Guide: Basic Data Model Concept" Sep. 16, 2004, pp. 1-4.
David Garrec, "DVG-CBMS: ESG blocks delivery", Motorola Labs, Nov. 15, 2004, pp. 1-8.
European Broadcasting Union, "Digital Video Broadcasting (DVB); Transmission System for Handheld Terminals (DVB-H)", Nov. 2004, pp. 1-14.
Nokia—Siemens—Vodafone, "Electronic Service Guide: ESG Transport Layer", Sep. 16, 2004, pp. 1-13.
Theirry Levesque, Sebastien Campion, Jean-Francois Leboite, Michel Guiraudou, David Garrec, Fabio Allamandri, John Cosmas, Lizhi Zheng, "Electronic Service Guide", Sep. 16, 2004, pp. 1-6.
Theirry Levesque, Sebastien Campion, Jean-Francois Leboite, Michel Guiraudou, David Garrec, Fabio Allamandri, John Cosmas, Lizhi Zheng, "Electronic Srvice Guide", Sep. 16, 2004, pp. 1-8.
Cedric Thienot, Gwenael Durand, Claude Seyrat, "Expway submission on metadata format and carriage in CBMS framework", Sep. 16, 2004, pp. 1-17.
Summary of Proposed Set of Fragments, pp. 1-9.
*Service Guide for Mobile Broadcast Services*, Draft Version 1.0—Aug. 18, 2005, Open Mobile Alliance, Ltd. 2005.
Advances in mass media delivery to mobiles, Walsh, R., MIPS2004 Tutorial, Nov. 16-19, 2004, Genoble, France, pp. 1-116.
Extended European Search Report of corresponding European Application No. 06744447.1-2202 dated Mar. 3, 2010, pp. 1-6.
TV-Anytime Phase 1, Evain, J.-P. et al. EBU Technical Review, Jul. 1, 2003, pp. 1-11.
Unidirectional IP-based mass file delivery protocol, Paila, T., Wireless Communication Systems, 1st International Symposium on Mauritius, IEEE, Sep. 20, 2004, Piscataway, NJ, USA, pp. 235-239.
European Office action for corresponding European Application No. 06744447.1-2202 dated Jun. 16, 2010, 1 page.
IP Datacast Over DVB-H: Electronic Service Guide (ESG), DVB Document A099, www.dvb-h.org, Nov. 2005, Sections 8.1-8.1.3.2, pp. 50-58.
Service Guide for Mobile Broadcast Services, Draft Version 1.0—Feb. 4, 2005, Open Mobile Alliance, OMA-TS-BCAST_ServiceGuide-V1_0_0-20050204-D, www.oma.org, Chapters 5.4-5.4.3, pp. 1-17.
ETS 300 707, Electronic Programme Guide; Protocol for a TV Guide using electronic data transmission, ETSI, European Telecommunication Standard, May 1997, pp. 1-90.
European Office action for corresponding EP Application No. 06744447.1-2202 dated Dec. 23, 2010, pp. 1-6.
Chinese Office action for corresponding CN Application No. 200680013557.2 dated Jul. 4, 2011, pp. 1-9.

* cited by examiner

| 500A → | type | (6 bits) | Type of this entry in Container Header |
|---|---|---|---|
| | entry_length | (10 bits) | Length of this entry in bytes. Always multiple of 4. |

| 500B → | type | (6 bits) | Type 1 is simplest ESG Fragment declaration |
|---|---|---|---|
| | entry_length | (10 bits) | Length of this entry in bytes. For type 1 the length is always 12. |
| | frag_format | (8 bits) | Defines the encoding of the ESG Fragment |
| | frag_version | (8 bits) | Version of the ESG Fragement |
| | frag_id | (32 bits) | Unique id of the ESG Fragment in its BaseURI |
| | | | Globally unique id is BaseURI directly appended with frag_id |
| | frag_offset | (32 bits) | Start of ESG Fragment, defined as bytes from the Container payload part. |

| 500C → | type | (6 bits) | Type 2 is ESG Fragment declaration that includes BaseURI and validity |
|---|---|---|---|
| | entry_length | (10 bits) | Length of this entry in bytes. Always multiple of 4. |
| | frag_format | (8 bits) | Defines the encoding of the ESG Fragment |
| | frag_version | (8 bits) | Version of the ESG Fragment |
| | frag_id | (32 bits) | Unique id of the ESG Fragment in its BaseURI |
| | | | Globally unique id is BaseURI directly appended with frag_id |
| | frag_offset | (32 bits) | Start of ESG Fragment, defined as bytes from the Container payload part. |
| | frag_valid_start | (32 bits) | 32 MSB of NTP time denoting the time when the validity of the ESG Fragment starts |
| | frag_valid_end | (32 bits) | 32 MSB of NTP time denoting the time when the validity of the ESG Fragment ends |
| | BaseURI | (var.) | BaseURI for the ESG Fragment. BaseURI is included as ASCII characters. Length of the BaseURI is is (entry-length-20). If the BaseURI does not align perfectly with the 4 byte rule of the entry, the ascii characters (zeros) are used for padding. |

| 500D → | type | (6 bits) | Type 3 is ESG Fragment list |
|---|---|---|---|
| | entry_length | (10 bits) | Length of this entry in bytes. Always multiple of 4. |
| | frag_format | (8 bits) | Defines the encoding of the ESG Fragment |
| | frag_version | (8 bits) | Version of the ESG Fragement |
| | frag_id | (32 bits) | Unique id of the ESG Fragment in its BaseURI |
| | | | Globally unique id is BaseURI directly appended with frag_id |
| | frag_offset | (32 bits) | Start of ESG Fragment, defined as bytes from the Container payload part. |
| | Note: | | If the fragment list does not align perfectly with 4 byte rule, in the end 16 zero bits shall be used for padding. This is the case when there is even number of |
| | ESG | | Fragments in the fragment list |

| 500E → | type | (6 bits) | Type 4 is Container-wide definition of BaseURI and validity of ESG Fragments. Note: Individual ESG Fragment declarations of type 2 shall override the definitions given in this entry. |
|---|---|---|---|
| | entry_length | (10 bits) | Length of this entry in bytes. For type 1 the length is always 12. |
| | frag_valid_start | (32 bits) | 32 MSB of NTP time denoting the time when the validity of the ESG Fragment starts |
| | frag_valid_end | (32 bits) | 32 MSB of NTP time denoting the time when the validity of the ESG Fragment ends |
| | BaseURI | (var.) | BaseURI for the ESG Fragment. BaseURI is included as ASCII characters. Lenght of the BaseURI is is (entry-length-10). If the BaseURI does not align perfectly with the 4 byte rule of the entry, the ascii characters with value zero are used for padding. |

Fig. 5b

IMPLICIT SIGNALING FOR SPLIT-TOI FOR SERVICE GUIDE

The present application claims priority to U.S. Provisional Application Ser. No. 60/664,332, entitled "IMPLICIT SIGNALING FOR SPLIT-TOI FOR SERVICE GUIDE DELIVERY" and filed Mar. 23, 2005, which is incorporated by reference in its entirety herein.

FIELD OF THE INVENTION

The invention relates generally to communications networks. More specifically, the invention relates to the signaling of an aggregate of data within a broadcast system.

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetised data stream, with fixed length packets, including a header. The individual elements of a program, audio and video, are each carried within packets having a unique packet identification (PID). To enable a mobile device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a mobile device to correctly process the data contained within the TS.

Aspects of the present invention, however, are also is applicable to other traditional digital mobile broadcast systems such as, for example, T-DAB, T/S-DMB, ISDB-T, ATSC, MediaFLO, and non-traditional systems such 3GPP MBMS (Multimedia Broadcast/Multicast Services) and 3GPP2 BCMCS (Broadcast/Multicast Service).

As image and other large files predominate the ESG transport, there exists a need to efficiently transport the ESG fragments across the desired networks to the end mobile devices. Previous systems transmitted a header before the ESG, however, this is quite inefficient because if containers carrying ESGs are transmitted before the header, the information is inaccessible until the header arrives and there is the risk of not receiving the header, thereby rendering the information in the container useless. Current attempts focus on associating several fragments together; however, these attempts have been largely unsuccessful due to the lack of unique identification of the fragments, an efficient header or indexing structure, or requiring the presence of repetitive parameters.

BRIEF SUMMARY OF THE INVENTION

Aspects of the present invention allow for the efficient transportation of ESG fragments to a mobile device through the formation of containers. In this sense, a container comprises at least one ESG fragment, but may contain a plurality of fragments. Alternatively, a fragment may be carried in more than one container. The containers are transported to the mobile device, for example, by using Asynchronous Layer Coding (ALC)/Layered Coding Transport (LCT) such that a single ALC/LCT transport object corresponds to a single container. The fragments can be utilized by the mobile device upon reception of the entire container. Aspects of the present invention utilize a simple and extensible header structure apart from the fragments independent of the type and format of the individual fragments. In further embodiments, compression is applied over the entire container, including the fragments and any headers. In yet further embodiments, other envelopes, e.g. a 3GPP metadata envelope may be carried within the container without the need for unnecessary repetition of parameters, such as for example, version, validity time, and identification.

Metadata within a 3GPP (3rd Generation Partnership Project) envelope or in any other form may include specific channels, specific programs, and/or specific channel bundles. Other types of metadata may include: package data, purchase data, such as operator identity data and technical data for performing the transaction, e.g., an address, protocol, price data which may be based upon package/day, channel/minute, program/minute; channel data, such as a textual description for a user, content provider branding information/logo, classification and rating data, such as genre and parental rating, channel SDP data, such as a description of capabilities needed to use the service, e.g., audio and video format and bit rate information, start and end time, addresses, addresses of synchronized auxiliary data feeds, proprietary extensions; and program data, such as a textual description for a user, start and end times, references for interactive services related to the program. This metadata may be loaded by an operator or may be performed automatically.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 5a and 5b illustrates a block diagram of an exemplary electronic service guide (ESG) fragment descriptor entries in accordance with an aspect of the present invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

To aid in organization and for the ease of the reader, the follow description is broken into two parts. First, systems and methods of providing data are described. Then, exemplary structures of the transport object identifier (TOI) fields are provided, where the exemplary TOI may be used with the systems and methods of providing data.

It is noted that various connections are set forth between elements in the following description. It is noted that these connections in general and, unless specified otherwise, may be direct or indirect and that this specification is not intended to be limiting in this respect.

The Provision of Data

Figure 1:
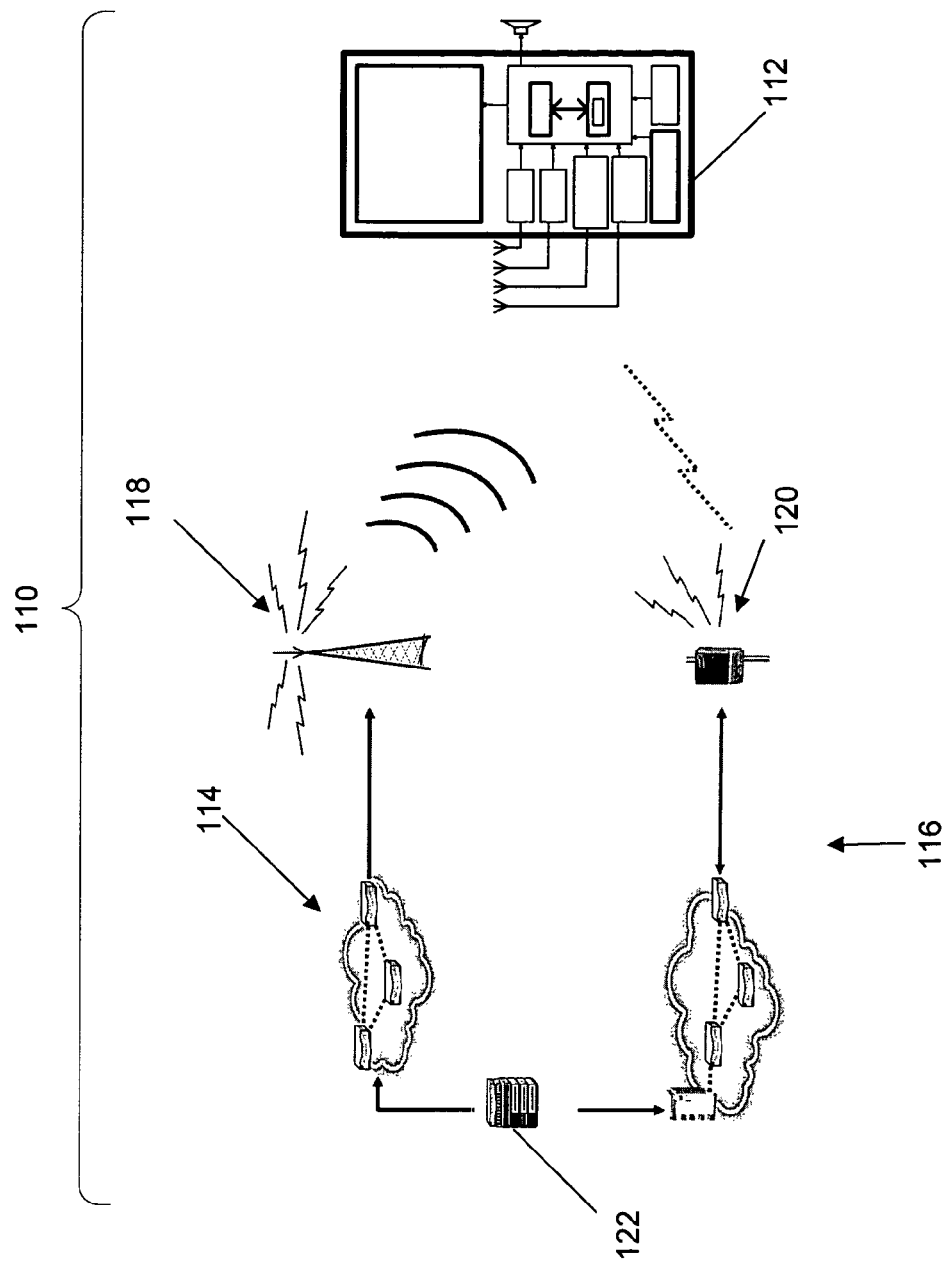
FIG. 1 illustrates a block diagram of a wireless communication system in accordance with an aspect of the present invention.

Various embodiments of the present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or a cellular network 116. The mobile device 112 may comprise a digital broadcast mobile device. The service source 122 may be connected to several service providers that may provide their actual program content or information or description of their services and programs to the service source that further provides the content or information to the mobile device 112, which may be used and/or displayed as an electronic service guide for user to select their services and programs. The several service providers may include, but are not limited to, one or more: television and/or digital television service providers, AM/FM radio service providers, SMS/MMS push service providers, or Internet content/access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to the mobile device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), or other wireless communication network such as a WLAN network. An example of WLAN includes 802.11 in its various formats.

In one aspect of the invention, the mobile device 112 may comprise a wireless interface configured to send and/or receive digital wireless communications within the cellular network 116. The information received by the mobile device 112 through the cellular network 116 or the broadcast network 114 may include user selection, applications, services, electronic images, audio clips, video clips, and/or other messages. As part of the cellular network 116, one or more base stations (not shown) may support digital communications with the mobile device 112 while the mobile device 112 is located within the administrative domain of the cellular network 116.

Figure 2:
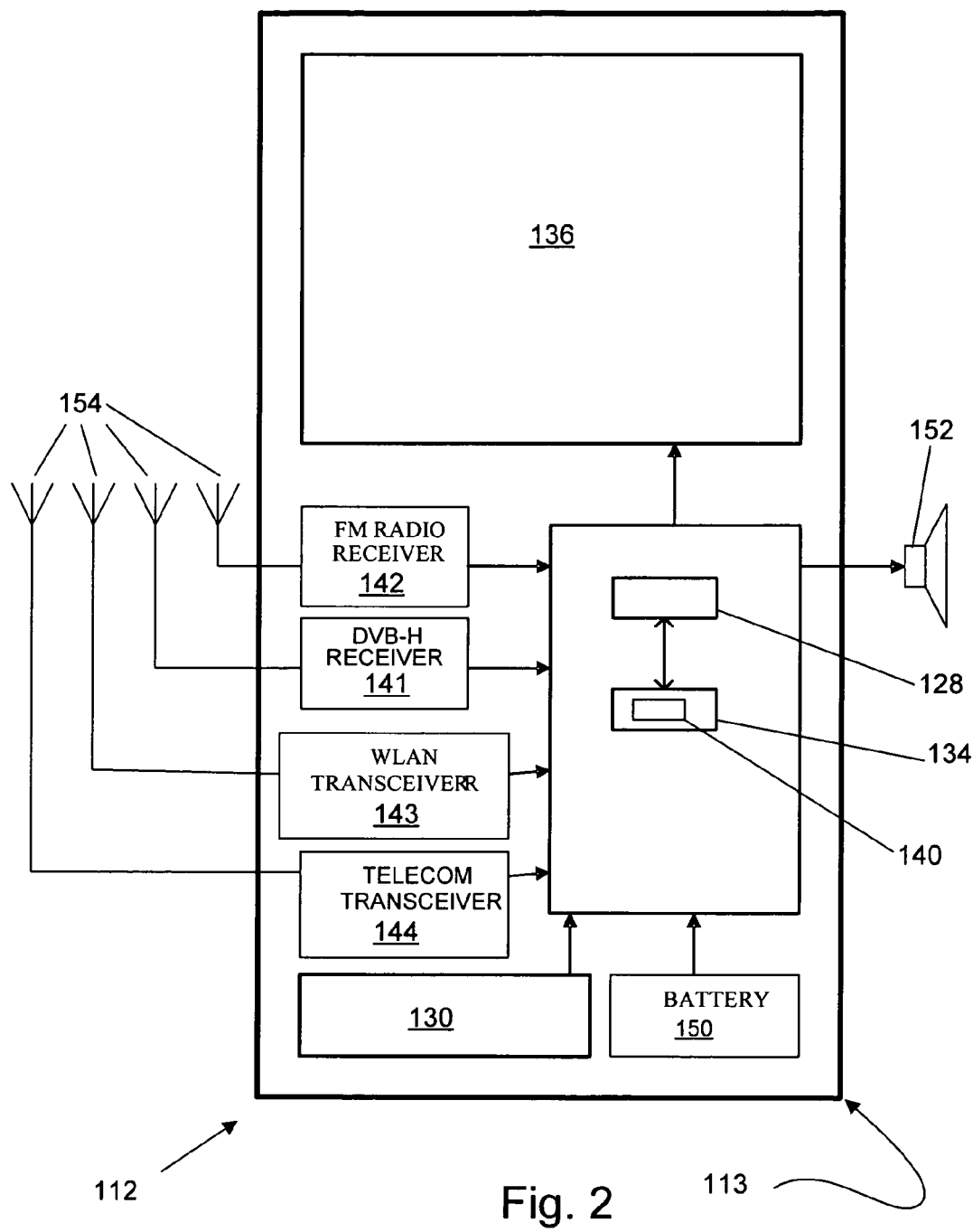
FIG. 2 illustrates a block diagram of a mobile terminal in accordance with an aspect of the present invention.

As shown in FIG. 2, the mobile device 112 may include a processor 128 within a housing 113. The processor 128 may be connected to a user interface 130, a memory 134 and/or other storage, and a display 136. The mobile device 112 may also include a battery 150, a speaker 152 and one or more antennas 154. The user interface 130 may further include a keypad, touch screen, voice interface, one or more arrow keys, joy-stick, data glove, mouse, roller ball, touch screen, voice interface, or the like.

Computer executable instructions and data used by the processor 128 and other components within the mobile device 112 may be stored in the computer readable memory 134. The memory 134 may be implemented with any combination of read only memory modules or random access memory modules, optionally including both volatile and nonvolatile memory and optionally being detachable. A software 140 may be stored within the memory 134 to provide instructions to the processor 128 for enabling the mobile device 112 to perform various functions. Alternatively, some or all of the mobile device 112 computer executable instructions may be embodied in hardware or firmware (not shown).

The mobile device 112 may be configured to receive, decode and process transmissions based on the Digital Video Broadcast (DVB) standard, such as DVB-H or DVB-MHP, through a specific DVB receiver 141. Additionally, the mobile device 112 may also be configured to receive, decode and process transmissions through a FM/AM Radio receiver 142, a WLAN transceiver 143, and a telecommunications transceiver 144. In one aspect of the invention, the mobile device 112 may receive radio data stream (RDS) messages. In general, a mobile device may include at least a portion of the functionality described with respect to the mobile device 112.

In an example of the DVB standard, one DVB 10 Mbit/s transmission may have 200 audio program channels at 50 kbit/s or 50 video (TV) program channels at 200 kbit/s. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as Advanced Television Systems Committee (ATSC), National Television System Committee (NTSC), Integrated Services Digital Broadcasting-Terrestrial (ISDB-T), Digital Audio Broadcasting (DAB), Digital Multimedia Broadcasting (DMB), MediaFLO or DIRECTV. Additionally, the digital transmission may be time sliced, such as in DVB-H technology. Time-slicing may reduce the average power consumption of a mobile terminal and may enable smooth and seamless handover between transmission points or different cells. Time-slicing consists of sending data in bursts using a higher instantaneous bit rate as compared to the bit rate required if the data were transmitted using a traditional streaming mechanism. If time-slicing is used, the mobile device 112 may have one or more buffer memories for storing the decoded time sliced transmission before presentation.

Figure 3:
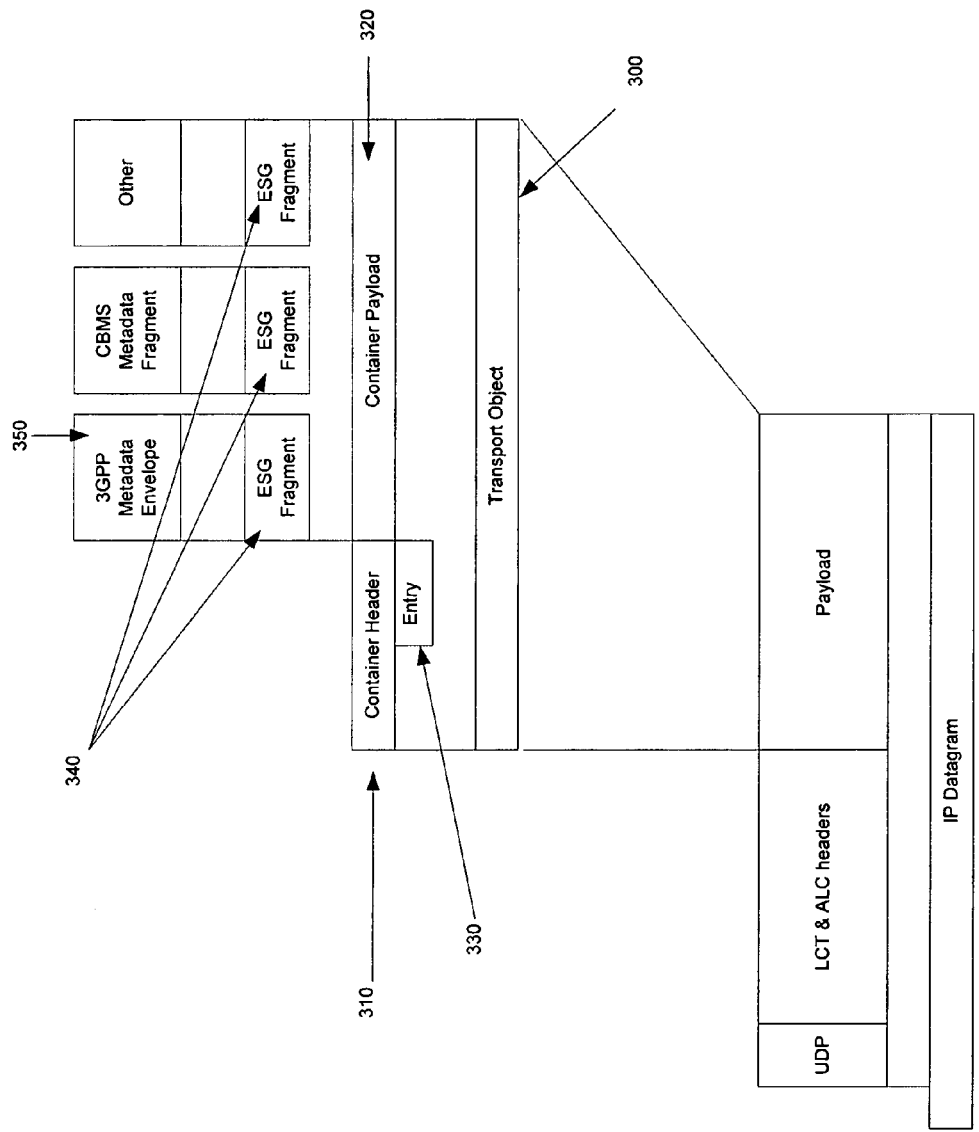
FIG. 3 illustrates a schematic diagram of an exemplary transport object in accordance with an aspect of the present invention.

FIG. 3 is a schematic diagram of an exemplary embodiment of a transport object (TO) in accordance with at least one aspect of the present invention. Generally, a single TO 300 comprises a container header 310 and a container payload 320. By incorporating the header 310 and the payload 320 into a single object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a mobile device of the entry length of the header.

In the exemplary embodiment, the header 310 may have a plurality of ESG fragment descriptor entries 330 that identify the ESG fragments 340 in the container payload 320 so that the mobile device may determine the exact position and/or length of each contained ESG fragment 340. For example, in one embodiment, a field specifies where the particular ESG begins within the container payload 320 by providing, for example, an offset value 550, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Figure 4:
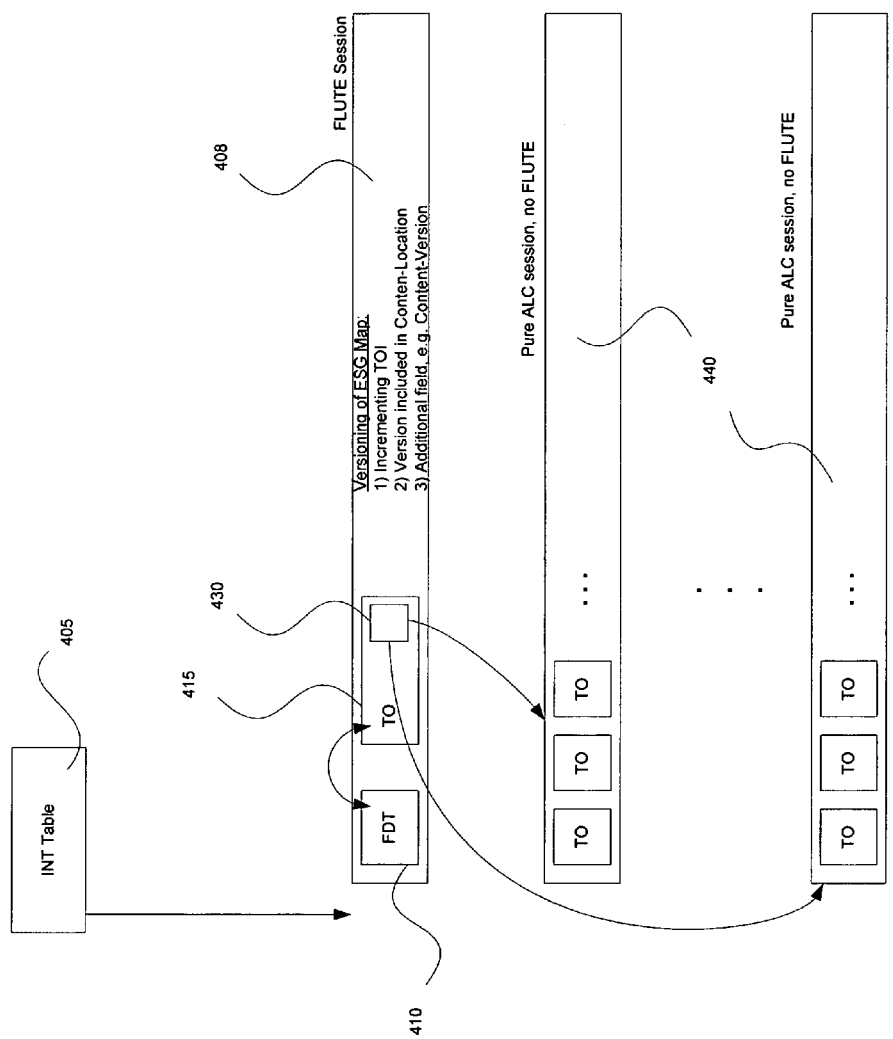
FIG. 4 illustrates a schematic of a method of transporting a plurality of transport objects in accordance with an aspect of the present invention.

FIG. 4 illustrates a schematic of an organization for use with a method of transmitting a multitude of single object transports wherein the transports are in accordance with at least one aspect of the present invention. As depicted, the TO of the current invention may be carried in, for example, FLUTE (File Delivery over Unidirectional Transport) sessions, or a pure ALC session. In the example of FIG. 4, the ESG Root Channel data, such as IP Address, port number and Transport Session Identifier (TSI), are announced in the IP/MAC Notification Table (INT Table) 405. A FLUTE session 408 of the ESG Root Channel comprises a File Delivery Table (FDT) 410 of the said session and one or more TOs 415. These TOs 415 may contain a declaration 430 that may contains mapping between the different types of ESGs and access parameters to the different ESG sessions in which the ESG data is transmitted. The ESGs may differ from each other e.g. as being in different languages and/or having different encoding or genre. The access parameters include IP Addresses, port numbers, TSIs, start and end times etc. The FLUTE session thus declares how the ESG data is distributed to different sessions. The TOs of the FLUTE session carrying this mapping data are described in the FDT 410 of the FLUTE session 408. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data is in this example delivered in ESG sessions 440, which may be pure ALC sessions, in one or more TOs. The same ESG data may be delivered in one or more ESG sessions. The ESG data or parts of it may be delivered in some embodiments of the invention in one or more FLUTE sessions in addition to or instead of ALC sessions.

Figure 5A:
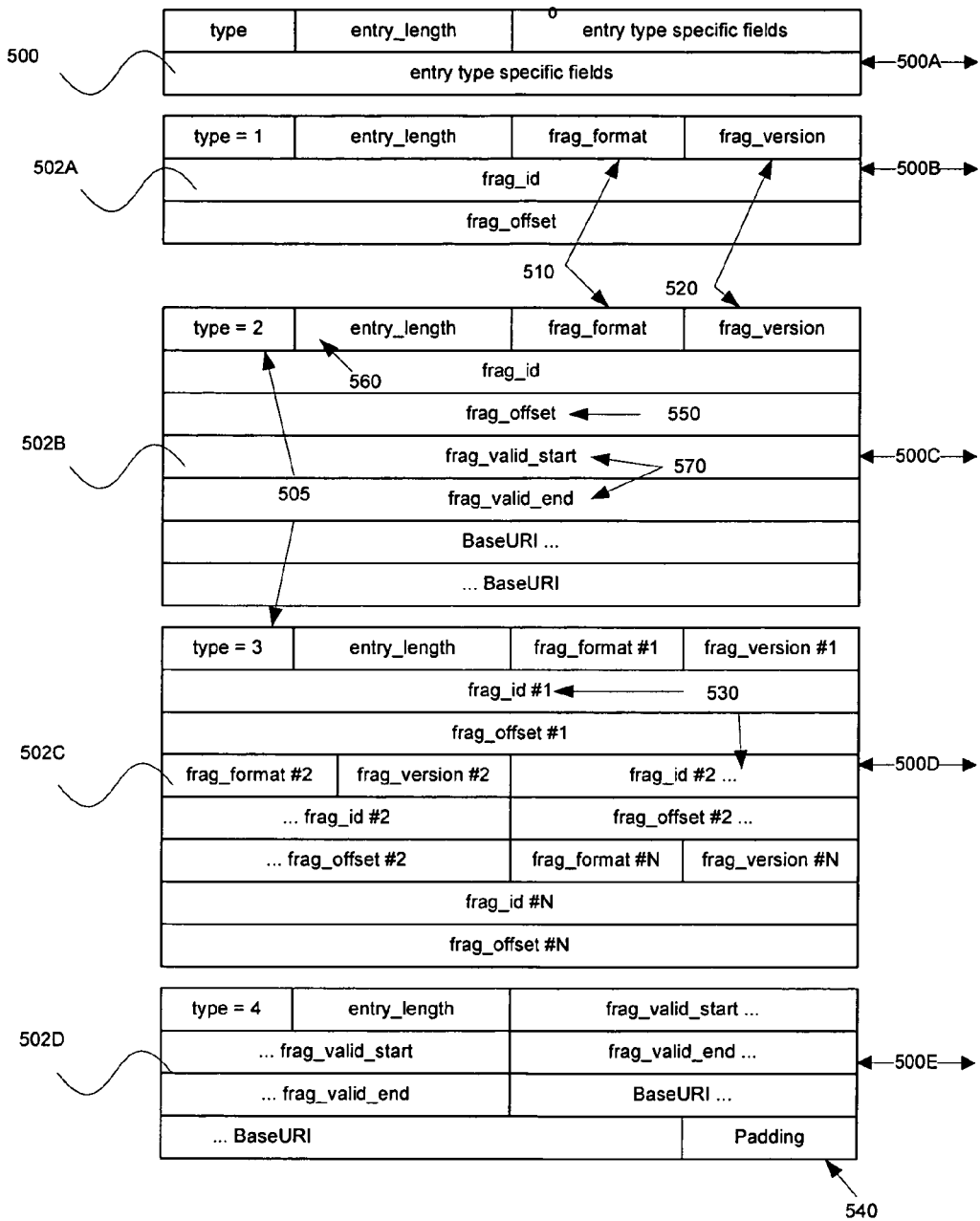

FIGS. 5*a* and 5*b* are a block diagram illustrating exemplary frames of the ESG fragment descriptor entries in accordance with an aspect of the present invention. Frame 500 illustrates a format of the protocol frame for the header 310 (FIG. 3). The frames having descriptor entries 502A-D are exemplary instantiations which include a type field 505 to indicate the type and features of an entry 330. The type field may be extensible to allow for the addition of new types of entries. By inputting an entry type into this field 505, different information is available to the mobile device. Frame instantiations 502A-D we have pre-defined specific metadata associated with fragments. For example, in 502B, the fields offset, start, end and baseURI are metadata for the corresponding fragment in the payload. Frame instantiation 502C, in turn, does not associate any metadata with the fragment it represents.

As described above, the payload may contain an envelope which associates metadata with the fragment itself (both included in the envelope) or indicate that metadata is located in the header. The payload may also include a type entry that provides predefined parameters of the ESG fragments located within the payload. Furthermore, as shown by frame 502C, a single descriptor entry may be configured by its type to describe a plurality of ESG fragments, or even different versions of the same ESG fragment. For example, frame 502A is flagged as a type 1 entry, and includes information regarding the ESG fragments such as a location, a format, a version information, and a unique identifier. To illustrate this point, frames 502 may provide additional information fields regarding the ESG fragments 340, such as a format 510, a version 520, and a unique identifier 530. In the exemplary embodiment, the format field 510 specifies whether an ESG fragment 500 is text, a video, and/or a picture. One skilled in the art, however, will realize that the format field 510 could specify virtually any information concerning the type of media contained in the ESG fragment 340.

A version field 520 may be included to allow the updating of previously received ESGs. For example, a newer version of an ESG can be automatically detected and executed, whereas an outdated ESG fragment as specified by the version field 520 may not be executed or may be executed at the discretion of the user of the mobile device. This is also often useful where local services are available. For example, when a mobile terminal moves from one geographical area to another geographical area, some services may remain available, some may no longer be available, and some may become available. Therefore, some of the ESG objects are valid in the new geographical area as in the old geographic area. In an embodiment, a terminal may identify those ESG objects which are valid in the new geographic area and may store/cache objects that are no longer valid. In another embodiment, a terminal may receive and store ESG objects from different frequencies, IP platforms, and network operators and then combine these objects with ESG objects from the current network into a unified ESG.

Optionally, a version field 520 may be coupled with or replaced by a validity field 570. While the version field 520 may indicate whether the received ESG fragment is the most current version or is configured to determine if compatibility issues exist, a validity field 570 may further separate useless or less prioritized ESG fragments. As illustrated in FIG. 5, one or more validity fields 570 may indicate time periods at which the associated fragment is valid. Alternatively, validity may be based on the mobile device's hardware, user defined settings, and/or the presence of other ESGs. By way of example, the presence of a BaseURI or location where the node was loaded, whether in the validity field 570, or another field, can permit verification of a received ESG fragment. In other embodiments, the BaseURI may allow the mobile device to utilize the information located at the URI in conjunction with or in place of the ESG fragment.

A unique identifier field 530 allows for the identification of an ESG fragment regardless of the information in the container header 310. Such information would, for example, be useful when several ESGs are received, executed, or otherwise no longer associated with the header or otherwise need to be universally identifiable. Each of the above information fields 510, 520, 530, among other utilized fields may optionally contain a padding field 540 to compensate for improper alignment with the byte rules of the entries. For example, if the location of an ESG fragment contains a BaseURI that does not supply enough bits for the entry, ASCII characters, such as zero, may be used to fill the needed spaces to fulfill the bits requirement. As disclosed, each ESG fragment may be coded for a different bit rate than other ESG fragments. In another embodiment, different bit rates may be utilized for different parameters within a single ESG, for example, in the different information fields 510, 520, 530.

The location of an ESG fragment may be obtained by utilizing an offset field 550 alone or in conjunction with an entry length field 560, wherein the fragment's offset can be measured from the header, an initial point within the payload, or any other point within the TO. The fragment offset and length value can be measured in bits, bytes, or any like quantifying system. As previously discussed, fields utilizing different systems (i.e. 6 bit, 10 bit, 32 bit) can all be can encoded within the same descriptor entry. Each descriptor entry 500, examples of which are provided in FIG. 5b as 500a-e, has a fragment identification field 530 which uniquely identifies the ESG fragment. In the exemplary descriptor entries 500C, 500D, 500E, the BaseURI is appended to the fragment's identification within the payload container to create a globally unique identifier.

Figure 6:
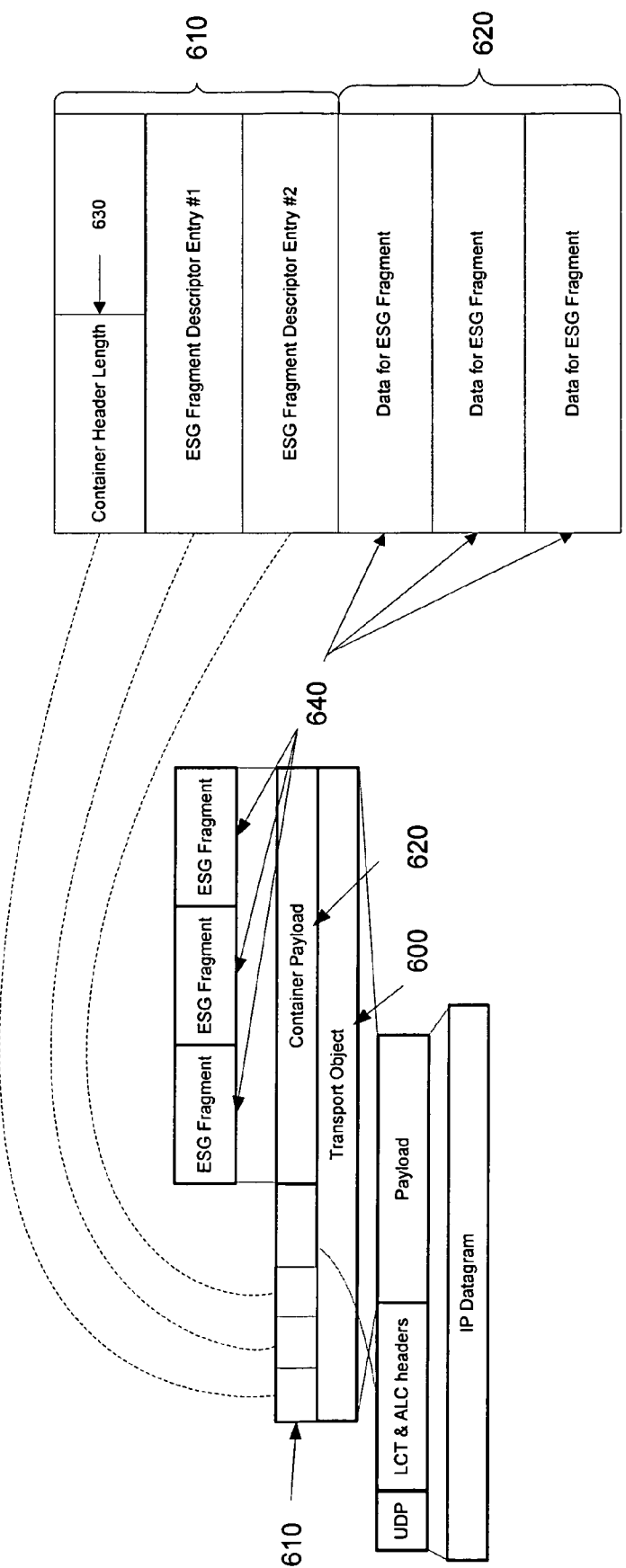
FIG. 6 illustrates a block diagram of an exemplary container having a plurality of ESG objects in accordance with an aspect of the present invention.

FIG. 6 illustrates a block diagram of an exemplary container having a plurality of ESG fragments in accordance with at least one aspect of the present invention. The TO 600 has a container header 610 preceding a container payload 620, together forming a single TO. The header 610 comprises a coding section regarding the header length 630. The header 610 may optionally contain a signaling mechanism or a transport encoding mechanism that is configured to signal that the TO or a portion thereof is encoded or otherwise compressed. In one embodiment, an LCT codepoint, located before or in the beginning of the header 610, can signal that the entire transport including the header is compressed. In other embodiments, a reserve field may comprise a codepoint that signals the encoding for the TO 600. By way of example, GZIP may be used for this purpose; however, one skilled in the art will recognize that numerous other alternatives will accomplish the goal of compression in this manner. In embodiments having a reserved field, additional information may optionally be included that relates, for example, to the ESGs, the header itself, or additional compression or encoding information. The container payload 620 comprises at least one ESG fragment 640, with some or all of the fragments having metadata (see FIG. 3). In some instances, the ESG fragments 640 do not have metadata, rather any requisite metadata is found in the header 610 associated with the appropriate descriptor entry. The TO may be stored in a memory at the transmitter, intermediate transmission nodes, and/or in the various mobile devices.

Figure 7:
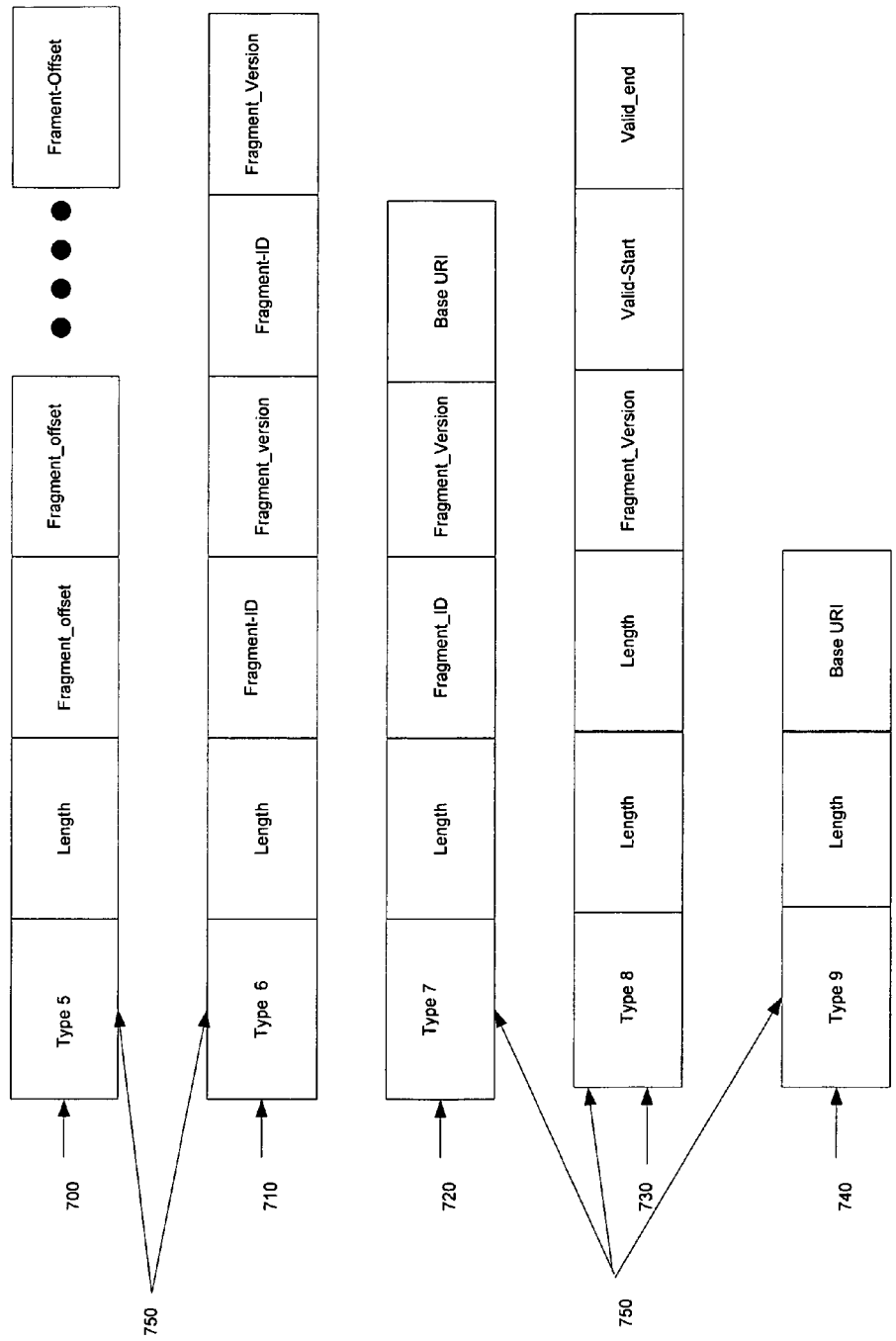
FIG. 7 is a block diagram illustrating exemplary frames of ESG fragment descriptor entries in accordance with an aspect of the present invention.

FIG. 7 is a block diagram illustrating further exemplary frames of an ESG fragment descriptor entries in accordance with at least one aspect of the present invention. The frames 700, 710, 720, 730, and 740 include a type field 750 to indicate the type of frame received. As discussed above, the type field 750 may be extensible to allow for the addition of new types of entries. Frame 700 illustrates a simple ESG descriptor entry that provides the position of ESG fragments in the payload. In the illustrated embodiment, an offset value of the ESG fragment is utilized to locate the fragments.

Frames 710, 720, and 730 illustrate the various types of descriptor entries that do not associate with any container payload. Rather, frames 710, 720, and 730 may be used to validate ESG fragments already received. In further embodiments, such as illustrated by frame 740, the descriptor entry may comprise a declaration of a BaseURI for the entire container.

In yet another aspect, the invention comprises a system and method of using the descriptor entries to determine whether a newly transmitted container is a valid update of a previously received container without the need to decode or otherwise process the information within the container payload. In an embodiment, a transmitter is configured to update numerous fragments as a single unit. The transmitted container may be further configured to mandate all targeted fragments are updated. It yet still another aspect, the invention comprises a system and method of using the same that only requires a single instance of a container type to determine the combination of fragments in each other possible instance of the same type.

Figure 8:
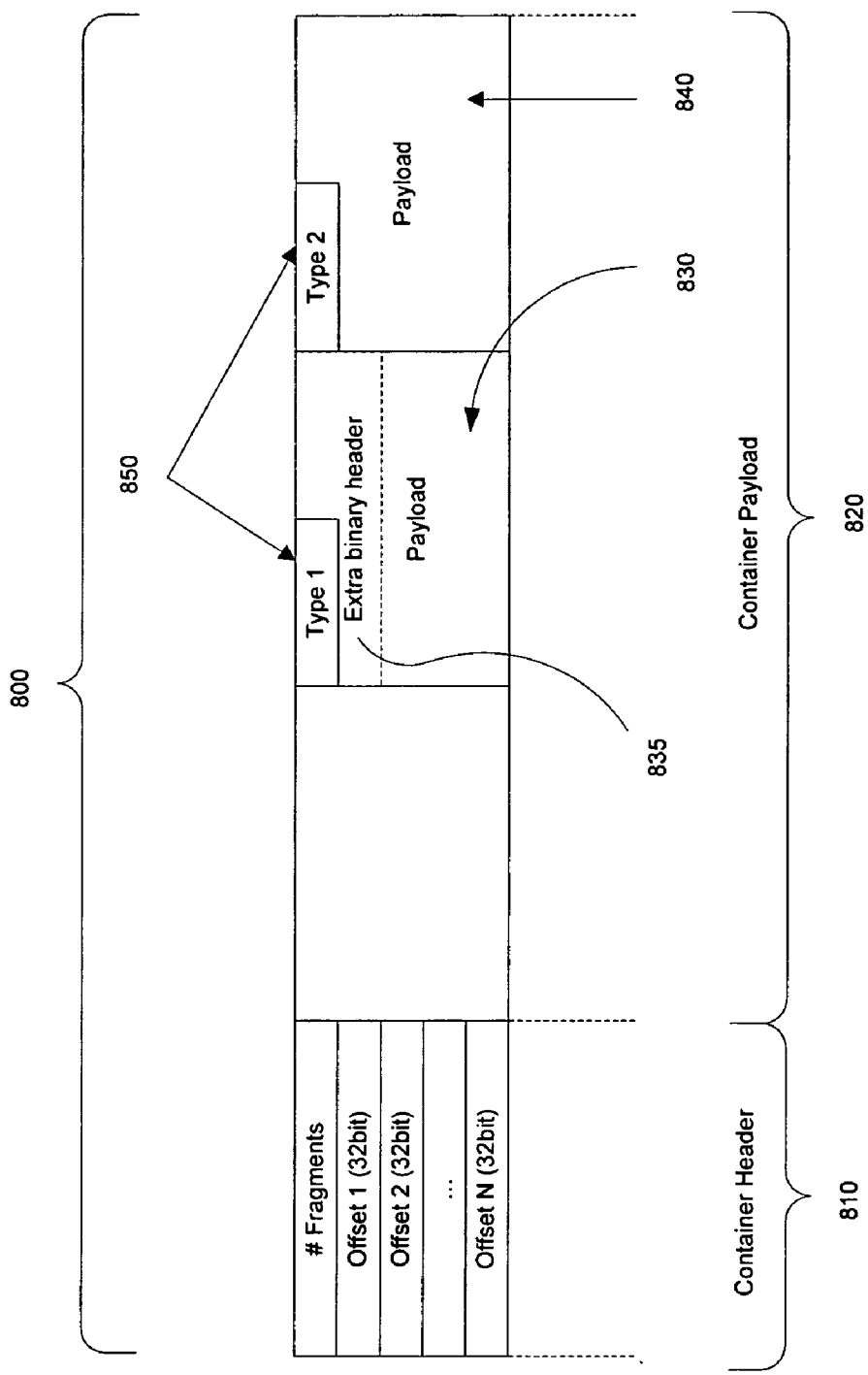
FIG. 8 is a block diagram of a simplified container system capable of updating previously received fragments in accordance with an aspect of the present invention.

FIG. 8 is a block diagram of a simplified container system in accordance with one embodiment of the present invention configured for the updating of previously received fragments. The system is configured to determine whether the newly transmitted container is a valid update without the need to decode or otherwise read the information within the container payload. An update container 800 generally comprises a container header 810 and a container payload 820. In the exemplary embodiment, the header 810 contains information relating the number of fragments in the payload 820 and the associated offset values; however, it is within the scope of the invention to include information relating to the header 810 and/or payload 820. The payload comprises data items 830, 840 having fragment updates. While the embodiment shows two data items, additional data items are contemplated as well as transmitting a single data item. Each data item includes an indication of its type 850.

The container 800 may further indicate the presence of a payload header 835. For example, the type 1 data item 830 could be a binary envelope having metadata in a header 835 as illustrated, the metadata being associated with predetermined fragments. Type 2 may indicate a 3GPP textual envelope associated with different fragments. The metadata therefore, is not fixed on the transport level. In addition to these examples, other container types may be defined.

Figure 9:
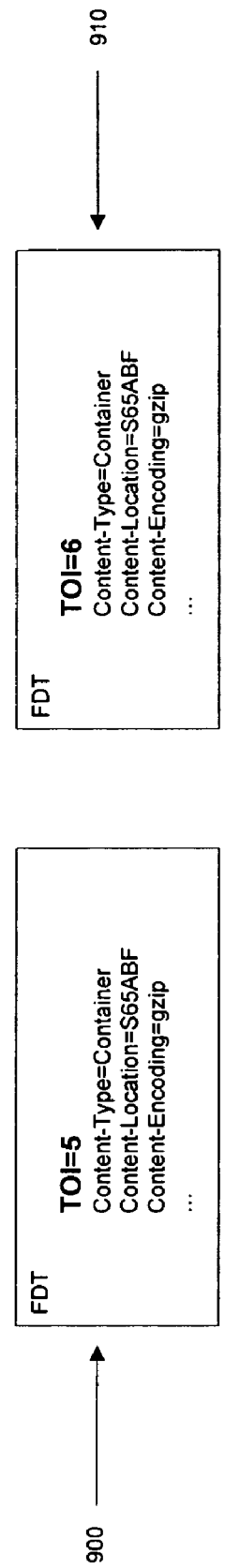
FIG. 9 is a block diagram illustrating a container and fragment management in an updating system in accordance with an aspect of the present invention.

The novel updating system is implemented through the configuration and management of the fragments and container instances. An "instance of fragments" or "fragment instance" concerns a fragment with specific type and version, wherein an "instance of a container" or "container instance" concerns a container holding specific instances of fragments. FIG. 9 is a block diagram illustrating the container and fragment management in an updating system in accordance with one embodiment of the invention. In the exemplary embodiment, a File Delivery Tables (FDT) 900 and a FDT 910 announce the instantiations of the grouping of fragments. The fragment types in each container type are determined by the mobile device when initially receiving the first container instance. All different container instances of the same type use the same signature, for example FDT Content-Location, but a different transfer object identifier (TOI). In the exemplary embodiment, the FDT 900 has a TOI=5 and the FDT 910 has a TOI=6, thereby indicating a different container instance, however, the Content Type and Content-Location remain unaltered. Two different container instances may have different encoding applied, i.e. they have different Content types. For example a container holding fragments A of version A1 and B of version B1 and a container holding fragments A of version A2 and B of version B2 have the same container type. Additionally, a container holding fragment A (regardless of the version) will have a distinctly different container type than a container holding fragments A, B and C (of any version). Additional optional fields, such as Content-Encoding can also remain in an unaltered state depending on the transmitter's preference. For example, if textual metadata is utilized, the entire container may be encoded with for example, GZIP or other mechanisms known in the art. In an alternative embodiment, portions of the container may be encoded.

Figure 10:
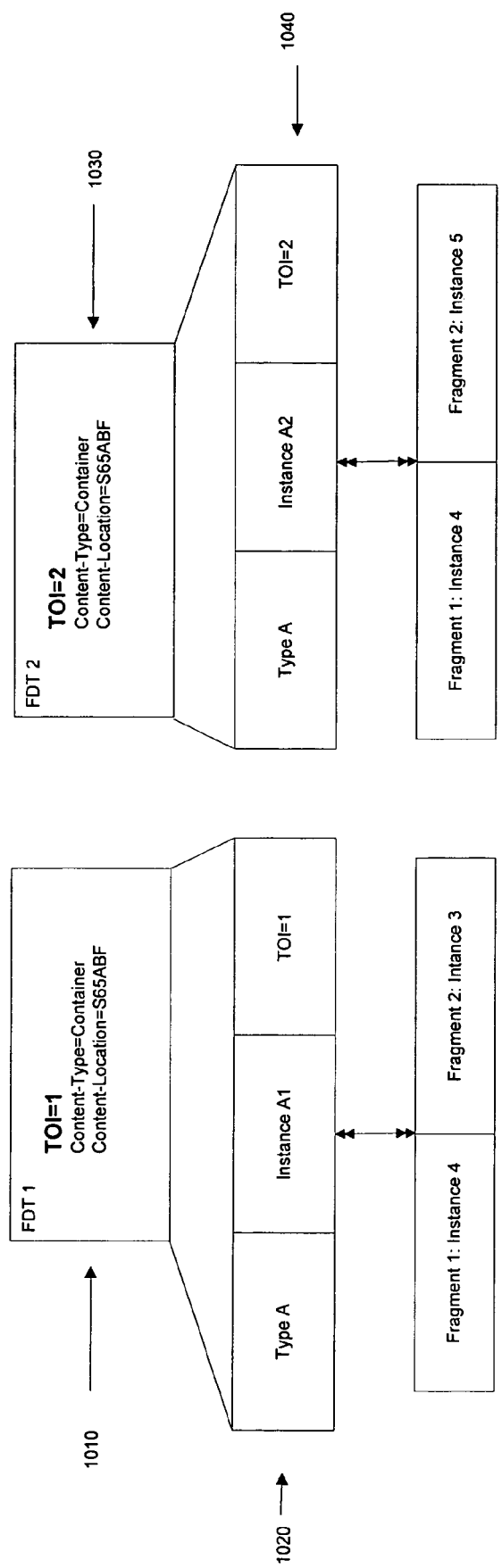
FIG. 10 is a block diagram illustrating a container update performed in accordance with an aspect of the present invention.

Container encoding and Forward Error Correction (FEC) can be declared by different mechanisms. For example, FDT parameters may declare the encoding mechanism. In one embodiment, the encoding and FEC are declared through the use of LCT extensions. The containers are encoded to enable the mobile device to determine if the container is to be decoded and processed without having to access or otherwise read the containers. FIG. 10 is a block diagram illustrating a container update performed in accordance with an exemplary embodiment of the invention. As depicted, the FDT 1010 has a TOI=1 and corresponds to a Type A container 1020 having an instance A1, and instance A1 comprises fragment 1:

instance 4 and fragment 2: instance 3. The FDT 1010 and the associated container 1020 are received at a terminal, where they are processed or rejected. The File Delivery Table 1030, represents an update to FDT 1010, and is received after the receipt of FDT 1010. FDT still corresponds to a Type A container 1040, however it includes instance A2 in place of instance A1, and may comprise changes such as, for example, fragment 1: instance 4 is not changed, but fragment 2: instance 3 is changed to instance 5. Upon receipt, the terminal determines that instance A2 includes one or more fragment updates as compared to instance A1. The terminal may further determine that A2 contains the same type of fragments as A1. In an embodiment, the terminal further determines, based on a myriad of factors, whether A2 is to be implemented.

Alternative Exemplary Structures for Transfer Object Identifier (TOI) Fields

In general, there are three conventional uses of ESG containers: static, dynamic and atomic.

First, the ESG containers may be used as an internal storage of ESG fragments in the mobile device in a static manner. In such a case, the ESG container includes a container identification and a container version associated with each ESG container. The ESG containers contain a static subset of ESG fragments. That is, for a particular ESG container only the versions of contained ESG fragments will change as the version of the ESG container changes.

Second, the ESG containers may be used as internal storage of ESG fragments in the mobile device in a dynamic manner. In such a case, the ESG container may include a container identification and a container version associated for each ESG container. The ESG containers may contain any subset of ESG fragments. That is, both the number of contained ESG fragments as well as the versions of the contained ESG fragments may change among different versions of the particular ESG container.

Third, the ESG container may also be used as the transport layer concept for delivering an atomic operation. In such a case, the ESG container does not need to be identified or versioned.

The ESG containers may be identified with a TOI. Below are several examples of ESG TOIs:

Example 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|S|    ContainerID              |    Container Version          |
+-+-+-+-+-+-+-+-+-+-+-+-+-+-+-+-+-+-+-+-+-+-+-+-+-+-+-+-+-+-+-+-+
```

| Bit # | Interpretation |
|---|---|
| 0; Most Significant Bit; (S) | 0 = Normal TOI (for example, see paragraph 51 above) |
| | 1 = Bits 1 ... 16 describe ESG ContainerID; Bits 17 ... 31 describe ESG Container Version |
| 1 ... 16 | ESG ContainerID |
| 17 ... 31 | ESG Container Version |

Example 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|S|D|    ContainerID          |       Container Version         |
+-+-+-+-+-+-+-+-+-+-+-+-+-+-+-+-+-+-+-+-+-+-+-+-+-+-+-+-+-+-+-+-+
```

| Bit # | Interpretation |
|---|---|
| 0; Most Significant Bit; (S) | 0 = Normal TOI (for example, see paragraph 51 above)<br>1 = Bits 1 . . . 15 describe ESG ContainerID; Bits 16 . . . 31 describe ESG Container Version |
| 1; (D) | 0 = Static container (for example, see paragraph 49 above)<br>1 = Dynamic container (for example, see paragraph 50 above) |
| 2 . . . 16 | ESG ContainerID |
| 17 . . . 31 | ESG Container Version |

Example 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|S| nnnn |     ContainerID     |       Container Version        |
+-+-+-+-+-+-+-+-+-+-+-+-+-+-+-+-+-+-+-+-+-+-+-+-+-+-+-+-+-+-+-+-+
```

| Bit # | Interpretation |
|---|---|
| 0; Most Significant Bit; (S) | 0 = Normal TOI (for example, see paragraph 51 above)<br>1 = Bits 5 . . . nnnn describe ESG ContainerID; Bits nnnn + 1 . . . 31 describe ESG Container Version |
| 1 . . . 4; (nnnn) | Value for nnnn |
| 5 . . . nnnn | ESG ContainerID |
| nnnn + 1 . . . 31 | ESG Container Version |

One skilled in the art will appreciate that numerous modifications may be made to the examples provided above. For example, alternative embodiments may combine features of the examples given above. Furthermore, in an embodiment the TOI sizes may be something other than 32 bits. The structure of the TOI may also be signaled implicitly within the TOI field itself, such as in Example 3, provided above. Therefore, explicit signaling in a FDT may not be required.

One or more of the types of containers discussed above may be stored as such and a previously received and stored container may be substituted with a newer version. The data in the container header may be used for updating the ESG fragments.

In an embodiment, a single ALC/FLUTE session can be reserved for the delivery of the ESG containers. Exemplary ALC/FLUTE sessions may be described by, for example, a SDP description. In such a SDP description, it can be explicitly pointed out that the target ALC/FLUTE session is used to carry only ESG containers. Hence, the mobile devices receiving such an ALC/FLUTE session can be configured to expect that the signaling in the TOI field is provided as described above.

Figure 11:
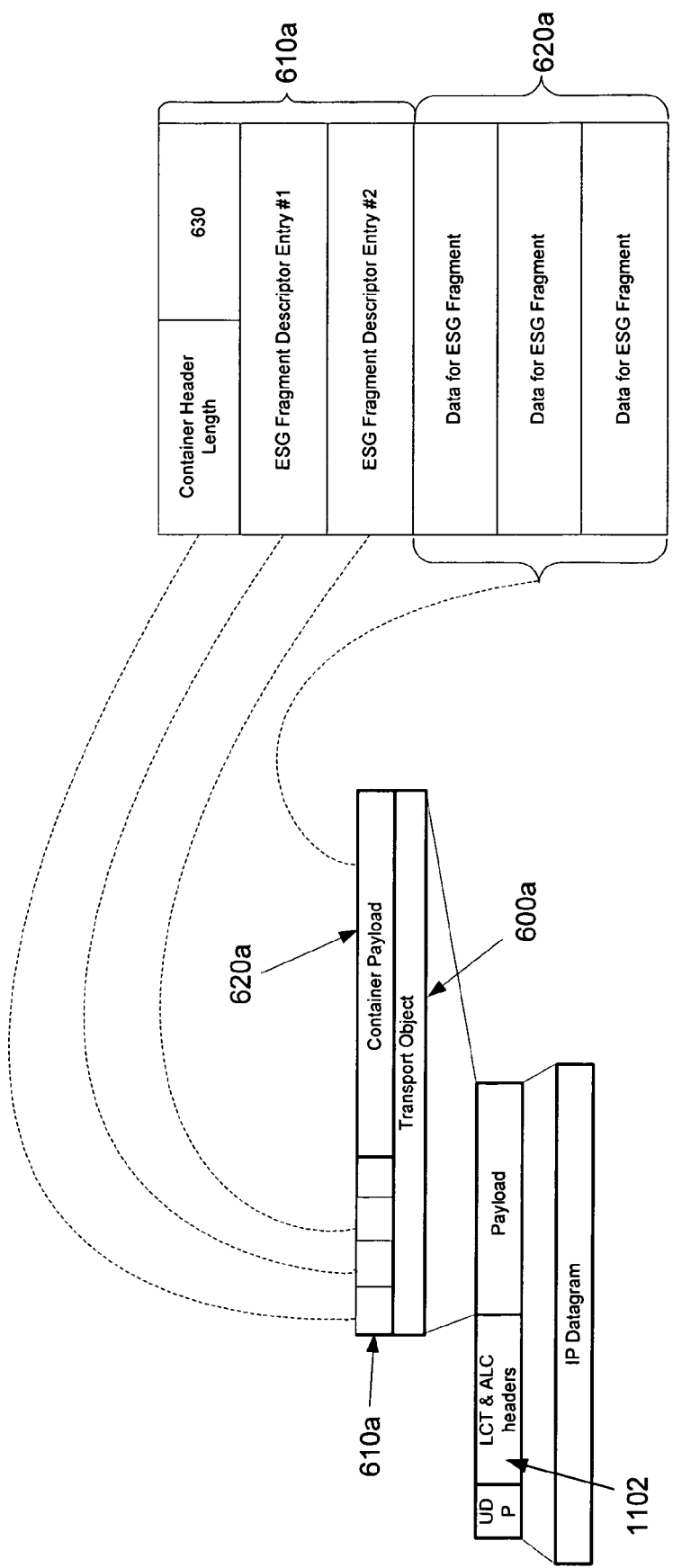
FIG. 11 illustrates a block diagram of an exemplary container having a plurality of ESG objects in accordance with an aspect of the present invention.

FIG. 11 illustrates an embodiment of the invention that is similar to the embodiment shown in FIG. 6. The TOI information described above may be included in a LCT header 1102. The LCT header 1102 is different from container header 610a and does not carry ESG fragment related information. The LCT header 1102, however, may carry container related information. For example, the LCT header 1102 could indicate what container held the information for each time slot as indicated in the example provided below:

|  | Day 1 | Day 2 | . . . | Day n |
|---|---|---|---|---|
| 00:00-03:59 | ID11 V0 | ID21 V0 |  | IDn1 V0 |
| 04:00-07:59 | ID12 V1 | ID22 V0 |  | IDn2 V1 |
| 08:00-11:59 | ID13 V0 | ID23 V1 |  | IDn3 V2 |
| 12:00-15:59 | ID14 V2 | ID24 V0 |  | IDn4 V1 |
| 16:00-19:59 | ID15 V0 | ID25 V1 |  | IDn5 V2 |
| 20:00-23:59 | ID16 V0 | ID26 V0 |  | IDn6 V1 |

In the example provided above, the ESG covers n days. Each day is divided into 6 four hour time slots. However, while uniformly depicted, the time slots are not necessarily of the same duration. In the illustrated example, "ID14 V2" means that the ESG fragments that relate to the services of day 1 from 12:00 until 15:59 are carried in the container having an identification ID14 and that at this moment the version of the container is #2, thus the contents of the container have been updated twice.

The ESG fragments that are carried in the container 'ID14 V2' might be, for example, a single cell, a number of cells or a row of the table below:

| 12:00-13:00 | News | Walter Cronkite |  |
|---|---|---|---|
| 13:00-13:30 | Sports | Basketball | Clippers-Portland |
| 13:30-15:30 | Talk show | Conan O'Brien | Special guest: Madonna |
| 15:30-15:59 | Soap Opera | Bold&Beautiful | Eric vs. Sally |

If the special guest of Conan O'Brien is changed, for example, the corresponding ESG fragment is changed and the container will be version 3. Accordingly, the information for day 1, slot 13:00-15:59 would be listed as "ID14 V3." The ESG fragment could include, for example, the cell for the special guest, the entire row for the time slot 13:30-15:30 or the entire table for the 4 hour period of the day.

The ESG fragments in the container may also comprise metadata similar to the metadata used in e.g. 3GPP envelopes as disclosed above.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended embodiments.

We claim:

1. A method comprising:
   receiving, at a user terminal, a current data container having one or more data fragments and a container header that includes a transport object identifier, wherein the transport object identifier denotes a container identifier, which indicates one or more types of the data fragments, and a version identifier, which indicates one or more instances of updated data fragments of the current data container for updating corresponding instances of data fragments from a previous data container;
   determining, by the user terminal, the one or more updated instances of the data fragments based at least in part on the transport object identifier; and determining to update corresponding instances of data fragments of the previous data container with the one or more instances of updated data fragments of the current data container.

2. A method as in claim 1, wherein the update is performed if the determination of the one or more updated instances of the data fragments indicates a same container type as the previous data container, and that at least one data fragment instance of the current data container is an update with respect to a corresponding data fragment instance of the previous data container.

3. A method as in claim 1, wherein at least a portion of the current data container is encoded or otherwise compressed, and the determination of the one or more updated instances of the data fragments is performed without decoding the encoded portion of the current data container.

4. A method as in claim 1, wherein the current and previous data containers consist of electronic service guide (ESG) containers and the data fragments consist of ESG fragments.

5. A method as in claim 1, wherein the container identifier comprises one or more of a container type, a container ID, a container version, and an encoding indicator.

6. A method as in claim 5, wherein the container identifier further comprises a field that identifies the data container as being either static or dynamic.

7. A method as in claim 6, wherein a static data container comprises a static set of data fragments and a dynamic data container comprises a dynamic set of data fragments.

8. An apparatus, comprising:
at least one processor; and
at least one memory including computer program code for one or more programs,
the at least one memory and the computer program code configured to, with the at least one processor, cause the apparatus to perform at least the following,
receive a current data container having one or more data fragments and a container header that includes a transport object identifier, wherein the transport object identifier denotes a container identifier, which indicates one or more types of the data fragments, and a version identifier, which indicates updated data fragments of the current data container for updating corresponding instances of data fragments from a previous data container;
determine the one or more updated instances of the data fragments based at least in part on the transport object identifier; and
determine to update corresponding instances of data fragments of the previous data container with the one or more instances of updated data fragments of the current data container.

9. An apparatus as in claim 8, wherein the update is performed if the determination of the one or more updated instances of the data fragments indicates a same container type as the previous data container, and that at least one data fragment instance of the current data container is an update with respect to a corresponding data fragment instance of the previous data container.

10. An apparatus as in claim 8, wherein at least a portion of the current data container is encoded or otherwise compressed, and the determination of the one or more updated instances of the data fragments is performed without decoding the encoded portion of the current data container.

11. An apparatus as in claim 8, wherein the current and previous data containers consist of electronic service guide (ESG) containers and the data fragments consist of ESG fragments.

12. An apparatus as in claim 8, wherein the container identifier comprises one or more of a container type, a container ID, container version, and an encoding indicator.

13. An apparatus as in claim 12, wherein the container identifier further comprises a field that identifies the data container as being either static or dynamic.

14. An apparatus as in claim 13, wherein a static data container comprises a static set of data fragments and a dynamic data container comprises a dynamic set of data fragments.

15. A non-transitory computer-readable storage medium storing a current data container, the current data container comprising:
a container payload that includes one or more data fragments; and
a container header that includes a transport object identifier, wherein the transport object identifier denotes a container identifier, which indicates one or more types of the data fragments, and a version identifier, which indicates one or more instances of updated data fragments of the current data container for updating corresponding instances of data fragments from a previous data container.

16. A non-transitory computer-readable storage medium as in claim 15, wherein the transport object identifier of the current data container facilitates the updating of the corresponding instances of data fragments of the previous data container with corresponding data fragments the instances of updated data fragments of the current data container based on at least in part on the transport object identifier of the current data container.

17. A non-transitory computer-readable storage medium as in claim 15, wherein the data container consists of an electronic service guide (ESG) container and the data fragments consist of ESG fragments.

18. A non-transitory computer-readable storage medium as in claim 15, wherein the container identifier comprises one or more of a container type, a container ID, a container version, and an encoding indicator.

19. A non-transitory computer-readable storage medium as in claim 15, wherein the container identifier further comprises a field that identifies the data container as being either static or dynamic.

20. A non-transitory computer-readable storage medium as in claim 19, wherein a static data container comprises a static set of data fragments and a dynamic data container comprises a dynamic set of data fragments.

* * * * *